United States Patent [19]

Breeck et al.

[11] Patent Number: 4,718,828
[45] Date of Patent: Jan. 12, 1988

[54] TAMPER-PROOF ADJUSTMENT SCREW ARRANGEMENT FOR VEHICLE FUEL SUPPLY SYSTEMS AND THE LIKE

[75] Inventors: Philip L. Breeck; George L. Muntean, both of Columbus, Ind.

[73] Assignee: Cummins Engine Company, Inc., Columbus, Ind.

[21] Appl. No.: 910,517

[22] Filed: Sep. 23, 1986

[51] Int. Cl.⁴ .................. F04B 21/00; F02M 59/44
[52] U.S. Cl. .................. 417/313; 123/198 E; 137/382; 261/DIG. 84; 292/307 B; 411/431; 411/910
[58] Field of Search .................. 417/313; 123/198 B, 123/198 E, 509; 411/910, 373, 375, 377, 430, 431; 261/DIG. 38, DIG. 84; 137/382; 292/307 B

[56] References Cited

U.S. PATENT DOCUMENTS

| | | |
|---|---|---|
| 4,209,000 | 6/1980 | Ivie . |
| 4,246,929 | 1/1981 | Wakeman .................. 261/DIG. 84 |
| 4,271,095 | 6/1981 | Maeda .............................. 137/382 |
| 4,272,458 | 6/1981 | Ruth et al. ...................... 137/382 X |
| 4,273,730 | 6/1981 | Byrnes ............................. 137/382 X |
| 4,308,220 | 12/1981 | Tateno ........................... 137/382 X |
| 4,470,769 | 9/1984 | Owens ............................... 417/313 |
| 4,621,230 | 11/1986 | Crouch et al. ...................... 411/910 |
| 4,645,422 | 2/1987 | Brushaber .......................... 411/910 |

Primary Examiner—Leonard E. Smith
Attorney, Agent, or Firm—Sixbey, Friedman & Leedom

[57] ABSTRACT

A tamper-proof adjustment screw arrangement for a vehicle fuel supply system for preventing tampering with the setting of an adjustment screw that is situated in a common recess with a component requiring the availability of continued access. In a preferred embodiment, a tamper-proofing shield coacts with the configuration of a portion of a recess having a stepped bottom wall and with a spanner jam nut on the adjustment screw to create a press fit mounting of the shield that makes it exceedingly difficult to pry off the tamper-proofing shield. As an additional safeguard, the spanner nut is designed to require a special tool for loosening thereof.

12 Claims, 7 Drawing Figures

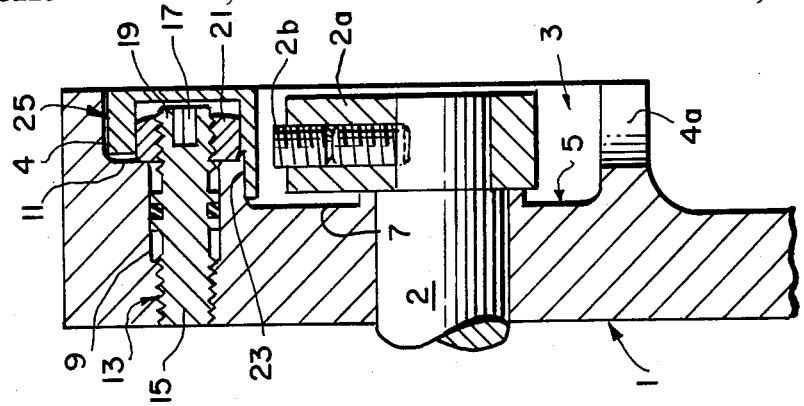
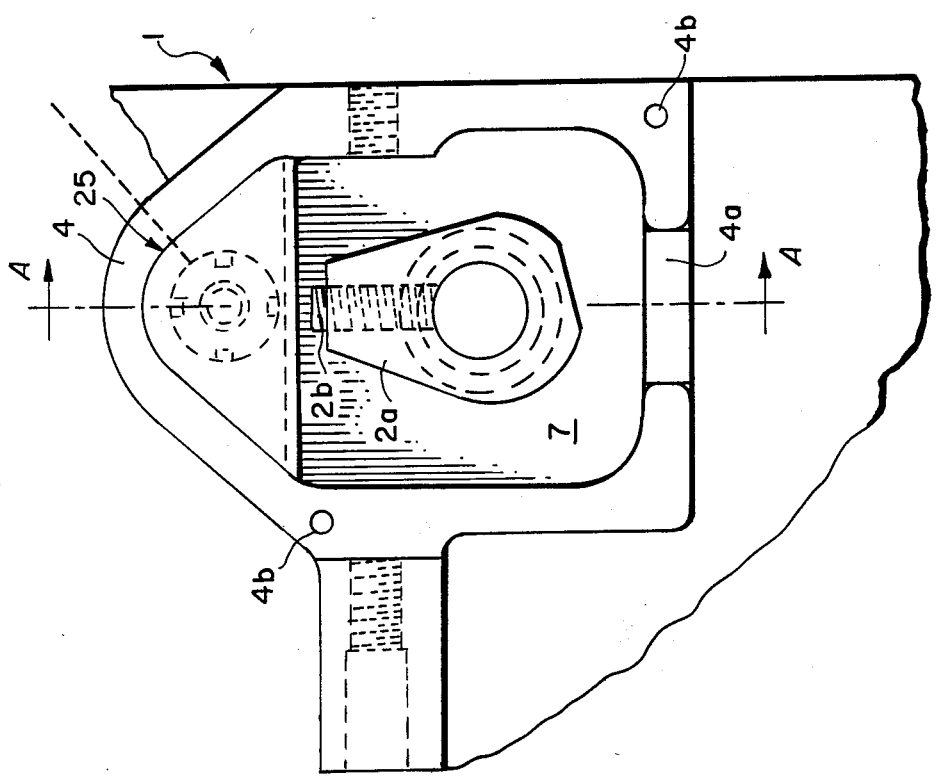

TAMPER-PROOF ADJUSTMENT SCREW ARRANGEMENT FOR VEHICLE FUEL SUPPLY SYSTEMS AND THE LIKE

TECHNICAL FIELD

The present invention relates to an arrangement whereby an adjustment screw of a vehicle fuel supply system may be rendered tamper-proof so as to prevent unauthorized fuel supply adjustments being made for the purpose of increasing engine horsepower that will potentially lead to malfunctions in the engine or damage to associated parts thereof. In particular, the arrangement in accordance with the invention is directed toward the fuel adjustment screw in the fuel pump of a PT fuel system for a diesel engine, but will also find applications in other types of fuel systems as well.

BACKGROUND ART

Normally, engines, such as diesel engines which use fuel injection pumps for delivering fuel to the engine via fuel injectors and gasoline engines which may use either fuel injection pumps or carburetor fuel supply systems, normally include an adjusting screw which controls the amount of fuel delivered to the engine, particularly under idle or no-air engine operating conditions. It is conventional for this adjustment screw to be pre-set by the manufacturer of the vehicle or engine. To prevent tampering with this adjustment to increase horsepower, and resultant premature failure of engine components, it has also been common practice to block access to the adjusting screw by a cover plate or cover plug. To further discourage tampering, a tamper-resistant seal in the form of a sealing wire and metal tag seal, is often associated with such a cover or plug as well. However, the temptation to a driver of the ability to boost engine horsepower by tampering with the fuel adjustment screw is sufficiently great that neither the presence of a cover plate and/or tamper seal is sufficient, in an of itself, to deter resetting of the fuel adjustment screw.

Thus, various attempts have been made to render shielding of the adjustment screw of a fuel supply system more effectively tamper-proof. For example, Tateno U.S. Pat. No. 4,308,220 discloses a tamperproof protecting construction wherein a sealing plug is force-fit into a chamber defined by a tubular protective wall which projects axially above the adjusting screw. The protective plug is held securely within the tubular protective wall due to the fact that the plug has a cup-like shape, the perimetric wall of which, in its unstressed state, is slightly larger than the inner size of the tubular protective wall chamber into which it is wedged and because the only access to the plug for removal thereof is via a slot for a prying rod which is dimensioned not to accept standard tools of the type found in a garage of machine shop.

However, it is not unthinkable that a resourceful driver or mechanic would be able to find a suitable rod for use in prying out the protective plug and the circular cylindric shape of the plug and chamber also affords the possibility of punching through the protective plug and turning both the screw and plug jointly. More importantly, however, is the fact that when circumstances make it necessary or beneficial to locate the adjustment screw within a large recess that is shared with other components, use of a wedged-in plug may not be feasible or desirable, particularly if access to the component sharing the recess with the adjustment screw is necessary.

Byrnes, Jr. U.S. Pat. No. 4,273,730 shows a tamper-resistant idle adjustment screw arrangement whereby the noted problem of gaining the ability to reset an adjustment screw by pryiny out, or punching or drilling through a seal plug covering the adjustment screw is solved via the provision of a blocking pin between the plug and adjustment screw that may be removed from its blocking position only by removing the carburetor from the engine to which it is associated. However, the location of the adjustment screw may not always afford the ability to implement such a solution, nor will such a solution usually be available with respect to the adjustment screw of an engine fuel pump.

Another approach which has been taken for the purpose of denying unauthorized access to the fuel adjustment screw of fuel supply systems has been the mounting of a cover plate thereover by non-removable means. For example, U.S. Pat. No. 4,272,458 to Ruth et al discloses a tamper-resistant idle adjustment screw arrangement for a carburetor wherein a U-shaped cover is mounted over the idle adjustment screws and removal thereof is precluded by virtue of the fact that the cover is secured by a rivet, access to which cannot be obtained without first unmounting the carburetor from the engine. Besides the fact that such an arrangement normally will not be suitable in the environment and engine fuel pump, removal of the rivet proposes an obstacle to the making of an authorized adjustment to the adjustment screw, that is further complicated by having to remove the carburetor. Likewise, such an arrangement also may not be usable in the noted situation wherein the adjustment screw shares space within a large recess with another component to which access is necessary.

Owens U.S. Pat. No. 4,470,769 shows a tamperresistant seal for a fuel injection pump wherein access to the adjustment screw is blocked by a cover plate bracket that is fastened over the adjustment screw by one-way fastening screws and over which another cover is permanently attached by a locking device. Such a construction is relatively costly and shares the shortcoming of all of the noted prior art arrangements in that it too is unsuitable for use in the situation wherein the adjusting screw shares a common recess with a component with respect to which it is not possible or desirable to preclude access to.

Thus, there is a need for a tamper-proof adjustment screw arrangement by which access to an adjustment screw can be precluded, not only in a simple and effective manner, but under such circumstances wherein the adjustment screw is situated within a recess alaong with another component with respect to which continued access should be afforded.

DISCLOSURE OF THE INVENTION

It is a general object of this invention to provide a tamper-proof adjustment screw arrangement for vehicle fuel supply systems and the like which will effectively discourage unauthorized readjustment of the adjustment screw setting.

It is a specific object in accordance with the present invention to provide a tamper-proof shielding of the adjustment screw of a fuel supply system under circumstances wherein the adjustment screw is situated within the same recess as a component to which access should be available.

It is yet another object of the present invention to provide a tamper-proof adjustment screw arrangement that utilizes a tamper-proofing shield which is simple, easy and inexpensive to manufacture and install.

It is yet another object in accordance with the present invention to provide a tamper-proof adjustment screw arrangement of the press fit mounted type wherein the effectiveness of the securement is enhanced by force-fitting of a tamper proofing shield into a fixing member for the adjustment screw.

These and other objects and advantages of the present invention are achieved, in accordance with a preferred embodiment of the present invention, by an arrangement wherein an adjustment screw is received in a bore situated at the bottom of a recess formed in an outer surface of a wall portion of a housing and is provided with tool engaging means for adjusting its position adjustment screw within the bore and means for fixing its position within the bore, both of which are located on a portion of the adjustment screw that projects outwardly from the bore into the recess. To block access to the adjustment screw and the means for adjusting and fixing located thereon, a tamper-proofing shield is provided that has a perimeter which is smaller than that of the recess and only partially conforming in shape to the recess. This tamperproofing shield is mounted within the recess in an overlying relationship with respect to the means for adjusting and means for fixing so as not only to block access thereto, but also to preclude rotation of the tamper-proofing shield, thereby avoiding the possibility of rotating the shield so as to permit, in some manner, rotation of the adjustment screw without removal of the tamper-proofing shield.

A particularly simple and secure mounting of the tamper-proofing shield is obtained, in accordance with the preferred embodiment, by having it held in place by a press fit mounting thereof within the recess that involves a force fit mounting of the shield onto a jam nut forming the means for fixing the adjustment screw. Furthermore, by utilizing, as the jam nut, a spanner nut requiring the use of a special spanner wrench for turning thereof, tampering with the setting of the adjustment screw is further hindered.

From the following description taken in conjunction with the accompanying drawings, which for purposes of illustration only show a single embodiment of the present invention, the present invention, including other objects, details and advantages thereof, will become apparent to those of ordinary skill in the art.

BRIEF DESCRIPTION OF THE DRAWINGS

FIG. 1 is a frontal view of a portion of a fuel pump of a fuel supply system illustrating the tamperproof arrangement in accordance with a preferred embodiment of the present invention.

FIG. 2 is a sectional view taken along line A-A in FIG. 1;

BEST MODE FOR CARRYING OUT THE INVENTION

Figure 3:
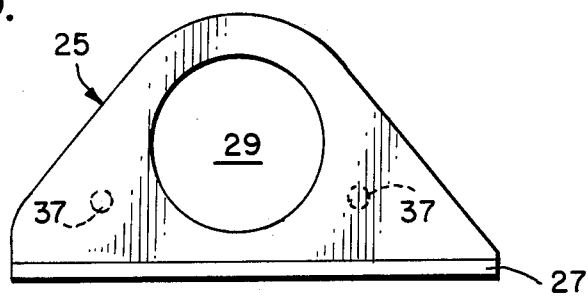
FIG. 3 is a rear elevational view of a tamperproofing shield forming part of the present invention.
Figure 4:
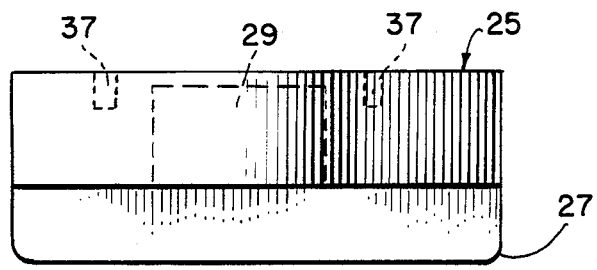
FIG. 4 is a top plan view of the tamper-proofing shield as shown in FIG. 3.
Figure 5:
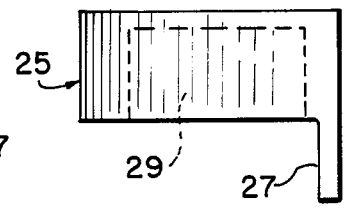
FIG. 5 is an end view of the tamper-proofing shield as shown in FIGS. 3 and 4.
Figure 6:
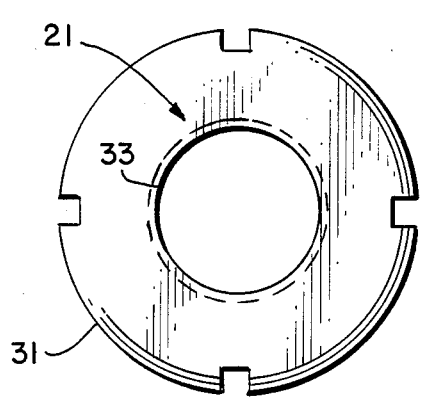
FIG. 6 is a plan view of a spanner nut for use in fixing the position of an adjustment screw of the present invention.

FIGS. 1 and 2 show, by way of example, a preferred embodiment of a tamper-proof arrangement for a vehicle fuel supply system, in accordance with the present invention, wherein a housing 1 may be the housing of a fuel pump of the type which might be used to deliver fuel to fuel injectors of a diesel engine as part of a PT fuel supply system. The PT ("pressure time") fuel supply system includes a simple mechanical injector unit which receives fuel from the fuel pump under pressure. In particular, the portion of the housing 1 shown in FIGS. 1 and 2 is in the vicinity of a rotatable throttle shaft 2. This throttle shaft 2 projects outwardly from the housing 1 into the recess 3 formed in an outer surface of the housing 1. This throttle shaft carries a throttle stop 2a that is fixed for rotation with the shaft by means of a set screw 2b. The perimetric wall 4 defining the perimeter of recess 3 has a notch-like opening 4a within which a microswitch would be mounted for engagement by the throttle stop upon rotation of the shaft during normal operation of the fuel supply system. It is also noted that a metering screw (not shown) would be present in the outer end of such a throttle shaft 2. A cover plate (also not shown) would be attached to the end face of perimetric wall 4, such as by rivets fastened within openings 4b (FIG. 1) and this cover plate would fully close the front side of the housing recess 3.

Additionally, the bottom 5 of the recess 3 has a bore 9 formed in a wall portion 11 within which an adjustment screw 13 is received. This adjustment screw 13 sets a basic fuel parameter of the fuel supply system such as the amount of fuel delivered under "no air" operating conditions. Adjustment screw 13 has a threaded inner end 15 which engages complementary threading of bore 9. Thus, by engaging, for example, an Allen wrench (not shown) within a tool receiving socket 17 formed in the outer end 19 of the adjustment screw 13, the axial position of the adjustment screw 13 within the bore 9 may be adjusted with a corresponding change in the fuel setting controlled thereby. The outer end 19 of adjustment screw 13 is also threaded and receives a spanner jam nut 21 which may be tightened down into engagement with the wall portion 11 of the bottom of the housing recess 3 as a means for fixing the position of the adjustment screw after proper setting thereof.

The structure described so far does not, in and of itself, form part of the tamper-proof adjustment screw arrangement of the present invention apart from the fact that it sets several constraints upon the nature of any tamper-proofing arrangement that might be applied thereto. For example, the noted frontal cover plate for recess 3 could not be made into a tamperresistant seal (as is done in the above-noted U.S. Pat. No. 4,470,769) because access must be maintained to the metering screw contained in the end of the throttle shaft for servicing purposes. Also, since the microswitch is removably mounted within opening 4a, by removal thereof, a tool could be used to pry off the cover, even if one-way fasteners were utilized. Furthermore, sealing of the entire recess 3 via a single plug-type seal, would also be unsuitable, not only for similar reasons, but because such would pose clearance problems with respect to the rotating shaft stop and the need for interaction between it and the microswitch disposed in opening 4a. On the other hand, because the adjustment screw 13 is disposed within the same recess 3 as the throttle shaft 2 and its throttle stop 2a, a conventional plate or plug like covering that is restricted to the area of the adjustment screw cannot be effectively utilized since the adjoining portion affords access for prying off the shielding or otherwise gaining access to the adjustment screw.

In view of the above-noted factors, the following features have been incorporated into the tamper-proof adjustment screw arrangement of the present invention. Firstly, the recess 3, itself, has been provided with a bottom 5 that is stepped so that the wall portion 11 within which bore 9 is situated above adjoining recess bottom portion 7, with a step riser wall 23 being disposed therebetween and extending across the recess 5 from one side to an opposite side. Additionally, the portion of perimetric wall 4 bounding wall portion 11 has been given a shape which, in conjunction with the riser 23, is generally triangular (any non-circular shape could be utilized even though the shape shown is preferred since it allows wall portion 11 to be kept to a minimal size).

To prevent unauthorized access to the adjustment screw, a tamper-proofing shield 25 is utilized in accordance with the present invention. As can be seen from FIGS. 1 and 3, tamper-proofing shield 25 has the same generally triangular shape as the wall portion 11, although it is slightly larger than this portion by an amount corresponding essentially to the area of riser wall covering extension 27 of shield member 25. Furthermore, the dimensions of shield member 25 are such that riser wall covering extension 27 will fit snugly against step rise 23 when the generally triangular portion of the periphery of shield member 25 is disposed in firm engagement with the angularly shaped portion of perimetric wall 4 that bounds the wall portion 11 of recess bottom 5.

To ensure that it is tremendously difficult to pry the tamper-proofing shield out of the recess 3, the tamaper-proofing shield 25 (which is formed preferably of steel) is thicker than the spanner jam nut 21, except for the provision of a receiving recess 29. Recess 29 is sized and shaped to enable it to be forcefit onto the spanner nut 21. The force fit connection between the spanner nut 21 and the tamper-proofing shield 25 together with the shaping of the shield into close conformance with the configuration of the recess portion within which it is received enables a press fit connection to be achieved which includes the force fitting of the shield onto the spanner nut. With such a form of mounting, it is tremendously difficult, if not impossible, to pry the tamper-proofing shield off of the spanner nut by means readily available to a driver or other unauthorized person desiring to tamper with the adjustment screw to increase engine horsepower. Additionally, the shape of the shield makes it impossible to turn shield 25 (and thereby back off the spanner jam nut 21 and readjust the adjustment screw 13).

Figure 7:
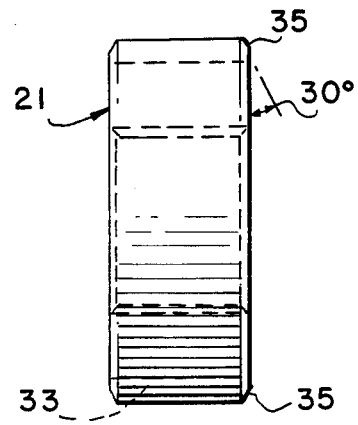
FIG. 7 is a side elevational view of the spanner nut as shown in FIG. 6.

However, if by some chance a person improperly seeking to tamper with the adjustment screw setting should get the tamper-proofing shield off of the jam nut 21, another characteristic of the arrangement in accordance with the present invention provides a further inconvenience. That is, the spanner jam nut 21 is provided with a circular cylindrical outer surface 31 with axially extending notches 33 (four in the illustrated embodiment) which requires a special spanner wrench to loosen once it has been tightened down upon the adjustment screw 13 into firm engagement with the wall portion 11. It is also noted that this special spanner nut 21 may be provided bevelled corners 35 at at least one face thereof, for facilitating the press fitting of the tamper-proofing shield 25 onto the spanner nut 21. In this regard, it has been found that a 30 degree angle, as shown in FIG. 7, is effective.

While as has been pointed out above, the tamper-proofing arrangement of the present invention is designed to make it very difficult for an unauthorized person to gain access to the adjustment screw 13, it is recognized that there will be times when it becomes necessary or desirable to effectuate a change in the setting of the adjustment screw 13 and that it should be possible to make such an authorized adjustment without undue difficulty. For such a purpose, at the time that removal is required, a pair of threaded holes 37 are drilled and tapped into the thick portion steel shield, one at each side of the recess 29. A screw (not shown) may then be threaded into each hole and used as a means to pull-out the tamper-proofing shield 25, such as by using a special tool or slide hammer. Such a process is simple and not significantly time consuming for a knowledgeable person having the appropriate tools. After removing of the shield member 25 and effectuating the readjustment of the adjustment screw 13, a new shield member, lacking the holes 37, is put back into place.

INDUSTRIAL APPLICABILITY

The present invention will find applicability in various types of fuel systems for vehicles, both those involving fuel pumps and fuel injectors and those of the carburetion type, where the location of the adjustment screw in proximity to other elements within a common recess makes it impractical to enclose the entire recess in a tamper-proof manner. On the other hand, while having particular suitability for vehicle fuel supply systems, it will be apparent to those of ordinary skill in the art that the tamper-proof adjustment screw arrangement can be of wider applicability and find use in numerous other environments wherein it is desired to prevent unauthorized access to a similarly situated adjustment screw type component.

Furthermore, in addition to a wider range of applicability than the specific embodiment disclosed herein, it will also be apparent to those of ordinary skill in the art that the present invention is susceptible to various changes and modifications without departing from the essence of the present invention. Therefore, it is intended that the present invention be viewed as encompassing such embodiments, modifications and changes as are encompassed by the scope of the following claims.

I claim:

1. A tamper-proof adjustment screw arrangement for vehicle fuel supply systems and the like, comprising:
   (a) a housing having a bore formed in a wall portion that is situated at the bottom of a recess formed in an outer surface of the housing;
   (b) an adjustment screw, said adjustment screw being received in said bore and being provided with tool engaging means for adjusting the position of said adjustment screw within the bore, and with means for fixing the position of said adjustment screw within said bore, said means for adjusting and means for fixing being located on a portion of the adjusting screw that projects outwardly from said bore into said recess; and (c) a tamper-proofing shield having a perimeter which is smaller than that of said recess and only partially conforming in shape to that of said recess, said tamper-proofing shield being mounted within said recess in an overlying relationship with respect to the means for adjusting and means for fixing in a manner that blocks access thereto and that precludes rotation of the tamper-proofing shield.

2. A tamper-proof arrangement according to claim 1, wherein said housing is a fuel pump housing and a rotatable throttle shaft of the fuel pump projects into said recess.

3. A tamper-proof arrangement according to claim 1, wherein said housing is a fuel pump housing and a rotatable throttle shaft of the fuel pump projects into said recess.

4. A tamper-proof arrangement according to claim 1, wherein said means for fixing is a jam nut threaded onto said outwardly projecting portion of the adjustment screw.

5. A tamper-proof arrangement according to claim 4, wherein aid jam nut is a spanner nut requiring the use of a special spanner wrench for turning thereof.

6. A tamper-proof arrangement according to claim 4, wherein said tamper-proofing shield is force fit onto said jam nut.

7. A tamper-proof arrangement according to claim 1, wherein the bottom of the recess is stepped, said wall portion being stepped above an adjoining recess bottom portion, and wherein the tamper-proofing shield is shaped to cover said wall portion and a riser wall between the wall portion and adjoining recess bottom portion.

8. A tamper-proof arrangement according to claim 7, wherein said riser wall extends across said recess from one side to an opposite side and wherein the perimeter of said tamper-proofing shield corresponds to the perimeter of said wall portion.

9. A tamper-proof arrangement according to claim 8, wherein the tamper-proof shield has a generally triangular shaped perimeter.

10. A tamper-proof arrangement according to claim 8, wherein said means for fixing is a jam nut threaded onto said outwardly projecting portion of the adjustment screw.

11. A tamper-proof arrangement according to claim 10, wherein said jam nut is a spanner nut requiring the use of a special spanner wrench for turning thereof.

12. A tamper-proof arrangement according to claim 10, wherein said tamper-proofing shield is force-fit onto said jam nut.

* * * * *